(12) United States Patent
Lamont

(10) Patent No.: US 7,740,198 B2
(45) Date of Patent: Jun. 22, 2010

(54) STRAW CHOPPER

(76) Inventor: John S. Lamont, 218 Tweedsmuir Road, Winnipeg, Manitoba (CA) R3P 1Z5

( * ) Notice: Subject to any disclaimer, the term of this patent is extended or adjusted under 35 U.S.C. 154(b) by 408 days.

(21) Appl. No.: 11/852,368

(22) Filed: Sep. 10, 2007

(65) Prior Publication Data

US 2008/0064457 A1    Mar. 13, 2008

(30) Foreign Application Priority Data

Sep. 11, 2006    (CA) .................................. 2559484

(51) Int. Cl.
*A01D 34/00* (2006.01)
*B02B 5/02* (2006.01)
*B02C 9/04* (2006.01)
*B02C 19/00* (2006.01)
*B03B 7/00* (2006.01)

(52) U.S. Cl. .................. 241/101.76; 241/236; 241/605; 460/112

(58) Field of Classification Search ............ 241/101.75, 241/101.76, 236, 282.1, 282.2, 605; 52/294, 52/504; 460/111, 112
See application file for complete search history.

(56) References Cited

U.S. PATENT DOCUMENTS

| | | | | |
|---|---|---|---|---|
| 3,797,765 A * | 3/1974 | Samuels | ..................... | 241/236 |
| 3,863,850 A * | 2/1975 | Freeman | ................ | 241/186.35 |
| 4,151,961 A * | 5/1979 | Makofka et al. | ....... | 241/101.76 |
| 4,156,508 A * | 5/1979 | Kisielewski | .................. | 241/80 |
| 4,452,400 A * | 6/1984 | Williams | ..................... | 241/36 |
| 4,637,406 A * | 1/1987 | Guinn et al. | ................. | 460/112 |
| 4,799,627 A * | 1/1989 | Potts | ........................... | 241/236 |
| 5,048,766 A * | 9/1991 | Gaylor et al. | .................. | 241/65 |
| 5,573,190 A * | 11/1996 | Goossen | ....................... | 241/27 |
| 5,622,323 A * | 4/1997 | Krueger et al. | ......... | 241/101.76 |
| 6,070,816 A * | 6/2000 | Hirsch | .................. | 241/101.742 |
| 6,616,528 B2 * | 9/2003 | Wolters et al. | .............. | 460/111 |
| 6,659,377 B1 * | 12/2003 | Coulter et al. | ................ | 241/60 |
| 6,695,240 B2 * | 2/2004 | Rajewski | ..................... | 241/236 |
| 6,896,215 B2 * | 5/2005 | Lucas et al. | ................. | 241/277 |

* cited by examiner

*Primary Examiner*—Bena Miller
(74) *Attorney, Agent, or Firm*—Ade & Company Inc.; Ryan W. Dupuis; Kyle R. Salterthwaite

(57) ABSTRACT

A straw chopper includes a pair of shafts supported in a chopping chamber for rotation about respective longitudinal axes extending generally in a forward working direction of the chopper. Chopping blades are supported on each shaft, offset in a direction of the longitudinal axes in relation to the chopping blades of the other shaft so that the shafts can be positioned with a sweep area of the blades overlapping one another. The shafts are rotated in a common direction of rotation such that the blades of one of the shafts are displaced in an opposite direction to the blades of the other one of the shafts at the overlap of the sweep areas. Each chopping blade includes an impeller surface sloped forwardly into a direction of rotation so as to generate a rearward thrust of air in the chopping chamber in the longitudinal direction of the axes from the inlet to the outlet of the chamber as the shafts are rotated.

20 Claims, 3 Drawing Sheets

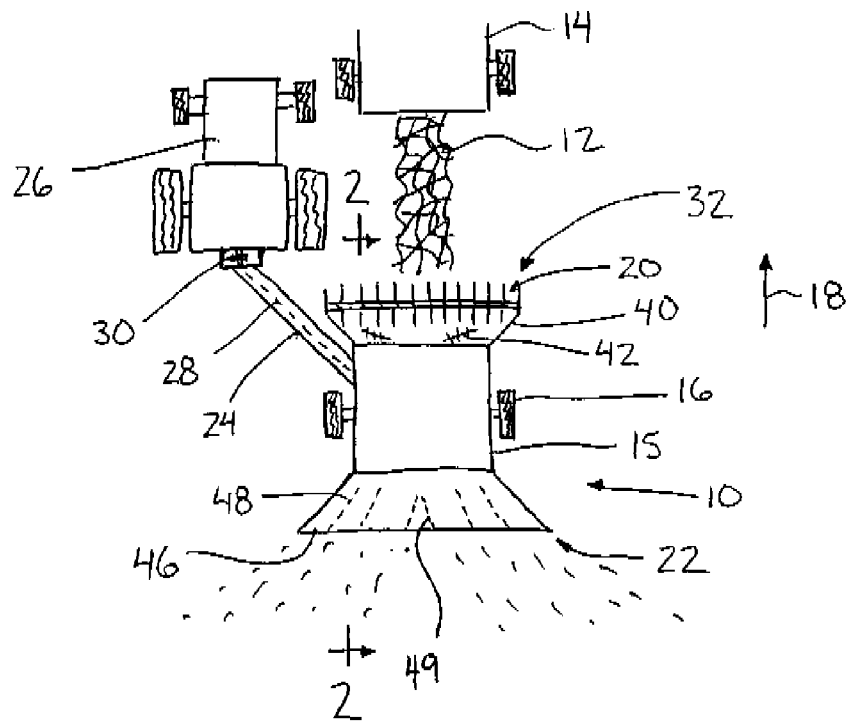
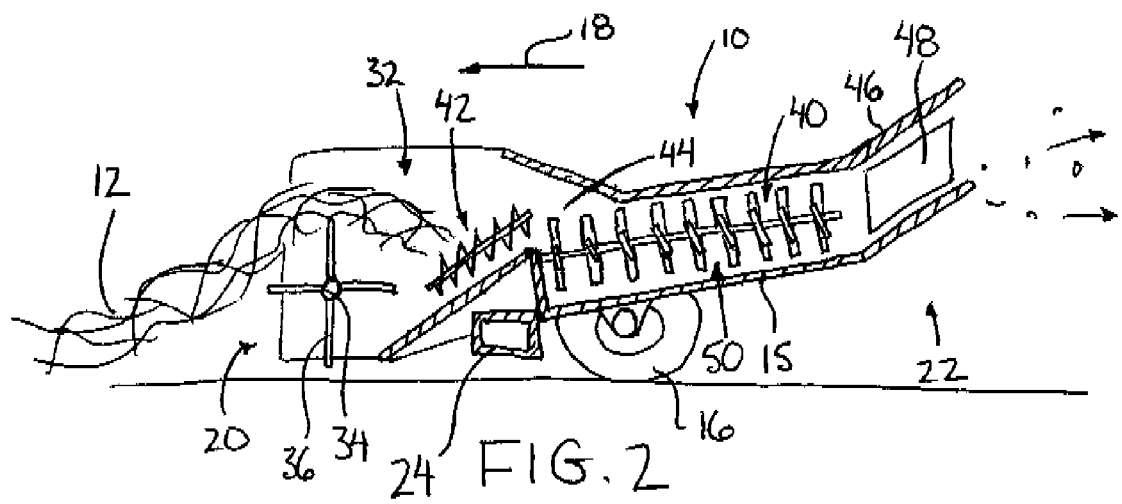

STRAW CHOPPER

This application claims foreign priority benefits from Canadian Patent Application 2,559,484 filed Sep. 11, 2006.

FIELD OF THE INVENTION

The present invention relates to a straw chopper for chopping straw into finer particles prior to spreading onto the ground for subsequent incorporation into the ground.

BACKGROUND

When harvesting grains and the like, it is a known practice to chop up the straw portion for redistribution over the ground. Redistributing the chopped up straw on the ground assists in maintaining moisture in the ground and also acts to return some nutrients back to the ground. In light soils, disc units are generally known to be effective to incorporate the straw into the soil and further break-up the straw to aid in its incorporation back into the soil. In heavier soils, for example clay type soils, known straw chopper attachments for combines and the like are generally known to not chop the straw finely enough to be effectively incorporated back into the soil by subsequent agricultural operations. The straw then interferes with subsequent seeding operations when replanting a new crop, and must be removed or burned.

U.S. Pat. Nos. 6,070,816 to Hirsch and 6,616,528 to Wolters et al. disclose examples of straw chopper attachments for a combine in which a pair of rotors carrying blades thereon are mounted for rotation about respective vertical axes in opposing directions. The rotors are positioned adjacent the discharge of the combine so that the straw must pass through the rotors to be distributed onto the fields. The configuration of the rotors readily permits straw to pass through the housing of the rotors in a single pass so that the straw is not necessarily effectively chopped.

U.S. Pat. No. 6,550,231 to Krone et al. discloses a harvesting machine comprising a self-propelled pickup chopper intended for chopping straw, however the machine involves a very complex arrangement of parts in order to effect this task.

SUMMARY OF THE INVENTION

According to one aspect of the present invention there is provided a straw chopper comprising:

a frame arranged to be supported for movement across the ground in a forward working direction;

a chopping chamber supported by the frame to extend generally in the forward working direction between an inlet arranged to receive straw and an outlet arranged to discharge the straw therefrom;

at least one shaft supported in the chopping chamber for rotation about a respective longitudinal axis extending generally in the forward working direction;

a plurality of chopping blades supported on said at least one shaft to extend radially outward from said at least one shaft;

each chopping blade including an impeller surface sloped forwardly into a direction of rotation of said at least one shaft so as to be arranged to generate a rearward thrust of air in the chopping chamber from the inlet to the outlet as the chopping blades are rotated about the about the respective longitudinal axis with said at least one shaft.

Each chopping blade may increase in dimension in a circumferential direction as the blade increases in radial distance from the shaft for increasing the dimension of the impeller surface and increasing the rearward thrust of air being generated.

According to a second aspect of the present invention there is provided a straw chopper comprising:

a frame arranged to be supported for movement across the ground in a forward working direction;

a chopping chamber supported by the frame to extend generally in the forward working direction between an inlet arranged to receive straw and an outlet arranged to discharge the straw therefrom;

a pair of shafts supported in the chopping chamber for rotation about respective longitudinal axes extending generally in the forward working direction; and a plurality of chopping blades supported on each shaft to extend radially outward from the respective longitudinal axis, the chopping blades of one shaft being offset in a direction of the longitudinal axes in relation to the chopping blades of the other shaft;

the shafts being positioned relative to one another such that a sweep area of the blades of one of the shafts overlaps a sweep area of the blades of the other shaft; and the shafts being rotated in a common direction of rotation such that the blades of one of the shafts are displaced in an opposite direction to the blades of the other one of the shafts at the overlap of the sweep areas.

By providing chopping blades on a pair of shafts rotating in the same direction, and overlapping one another, two sets of blades are arranged to be displaced in opposing directions at an area of overlap in the rotation of the two shafts to encourage a more thorough chopping of the straw. Furthermore by orienting the longitudinal axis of the shafts to extend generally in the working direction at an upward and rearward slope, the straw must pass through multiple sections of overlapping blades in order to be discharged from the inlet through to the outlet of the chopping chamber. Forcing the path of the straw along the length of the shaft thus further ensures more effective chopping of the straw.

Preferably the frame is supported on respective wheels for rolling movement across the ground in the forward working direction.

In one embodiment, the frame includes an offset hitch arm for connection to a towing vehicle in a laterally offset relationship. Alternatively, the frame may include drive means such that the frame is self-propelled across the ground in the forward working direction.

Preferably a pickup assembly is mounted on the frame forwardly of the chopping chamber comprising: a pickup shaft supported horizontally and transversely to the forward working direction for rotation about a respective longitudinal axis of the shaft and a plurality of tines extending radially outward from the shaft for collecting straw from the ground as the shaft is rotated, the shaft being rotated such that the tines at a front of the shaft are rotated upwardly.

The pickup assembly may include a conveyor which conveys straw from the pickup shaft to the inlet of the chopping chamber.

The longitudinal axis of the shafts preferably extend rearwardly at an upward incline from the inlet to the outlet of the chopping chamber.

A chute at the outlet of the chopping chamber may also extends at an upward and rearward incline to assist in dispersing the chopped straw across the ground.

One embodiment of the invention will now be described in conjunction with the accompanying drawings in which:

BRIEF DESCRIPTION OF THE DRAWINGS

FIG. 1 is a schematic plan view of the straw chopper connected to a towing vehicle.

FIG. 2 is a partly sectional side elevational view of the straw chopper generally along the line 2-2 of FIG. 1.

In the drawings like characters of reference indicate corresponding parts in the different figures.

DETAILED DESCRIPTION

Figure 3:
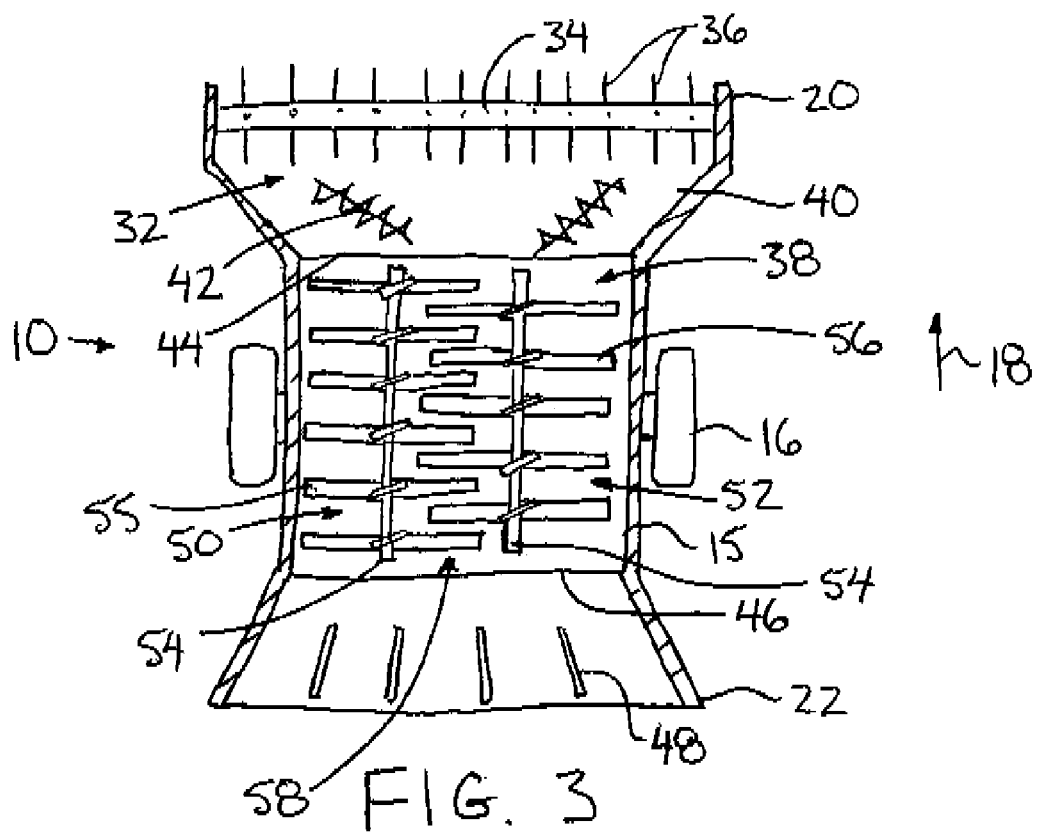
FIG. 3 is a partly sectional top plan view of the straw chopper.
Figure 4:
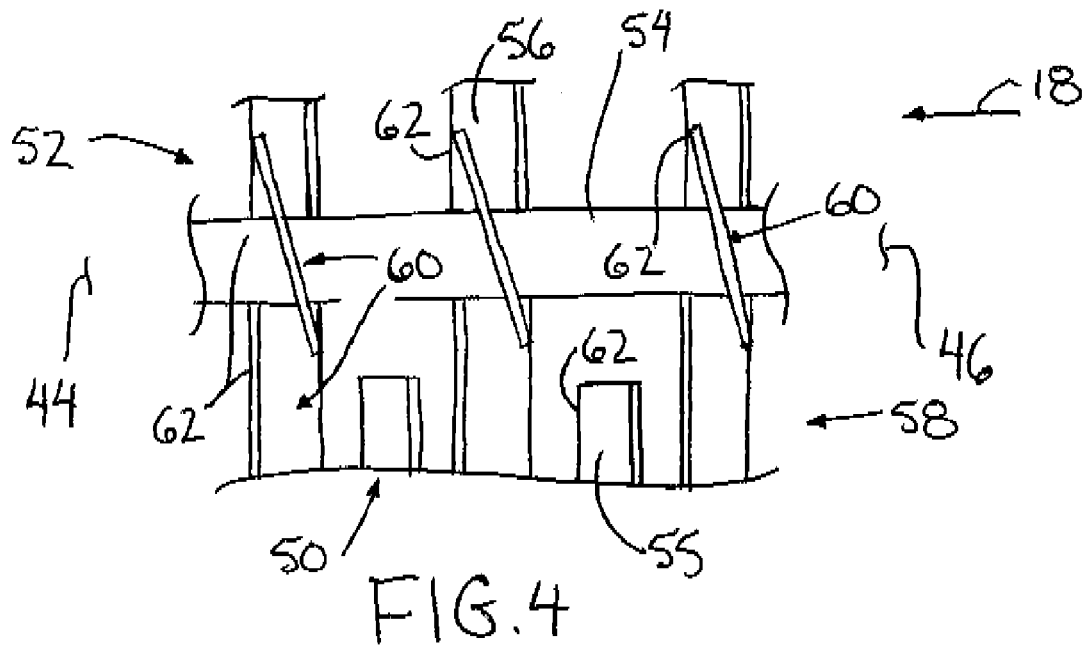
FIG. 4 is an elevational side view of one of the shafts supporting the chopping blades thereon.
Figure 5:
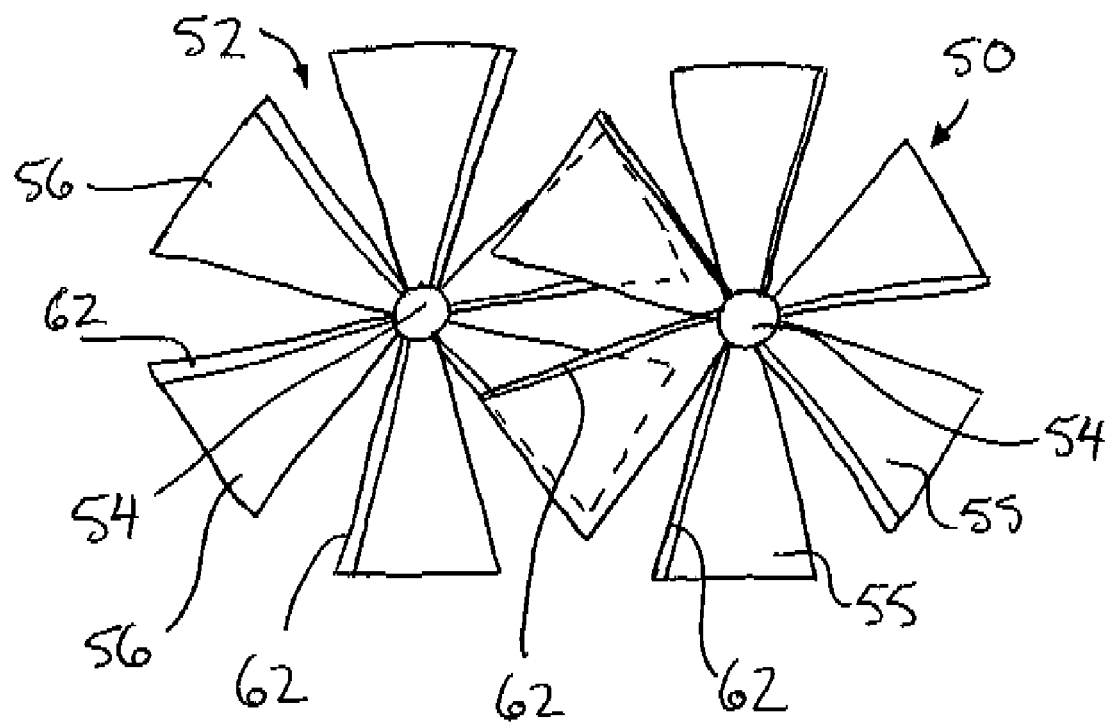
FIG. 5 is an end view of the shafts supporting the chopping blades.

Referring to the accompanying figures there is illustrated a straw chopper generally indicated by reference numeral 10. The chopper 10 is particularly useful for collecting straw from a windrow 12 of cut straw along the ground, however in some embodiments the chopper may be arranged to collect cut straw directly from the discharge of a combine 14. Whether the chopper collects the straw from a windrow 12 on the ground which has been previously discharged from a combine or collects the straw directly from the combine, in either instance the straw is collected, more finely chopped and then spread back onto the ground for subsequent incorporation into the soil, thus assisting the soil in retaining moisture and returning nutrients to the soil.

The chopper 10 includes a frame 15 supported on wheels 16 for rolling movement in a forward working direction 18 of the chopper. The chopper is arranged to collect straw from the windrow on the ground at a front end 20 of the chopper while discharging more finely chopped straw from the rear end 22.

An offset hitch arm 24 is coupled to the frame 15 of the chopper and extends laterally outwardly greater than the width of the chopper in a lateral direction for connection to a towing vehicle 26 such a conventional agricultural tractor. A drive train 28 extends along the hitch arm 24 for connection between a PTO (power takeoff) 30 of the towing vehicle 26 and the driven components of the chopper 10.

A pickup assembly 32 is mounted at the front end 20 of the chopper for collecting the straw. The pickup assembly generally comprises a horizontal pickup shaft 34 which spans across the front of the chopper close to the ground and perpendicular to the forward working direction 18. The shaft is driven to rotate about its respective longitudinal axis by connection to the drive train 28.

A plurality of pickup tines 36 are mounted on a shaft to project radially outward therefrom of sufficient length to substantially reach the ground from the shaft 34. The tines 36 are fixed on the shaft for rotation therewith and are located at evenly spaced positions about the circumference of the shaft and along the length of the shaft. The shaft 34 is rotated so that the tines 36 on the front side of the shaft are rotated upwardly so that the straw which is engaged by the tines on the ground is lifted upwardly and over the pickup shaft 34 of the pickup assembly to be deposited into a chopper chamber 38 of the chopper which is positioned rearwardly of the pickup assembly 32.

The pickup assembly further includes a chute 40 which tapers rearwardly and inwardly from the wider pickup assembly 32 to the more narrow chopping chamber 38. The chute 40 extends rearwardly at an upward incline and includes conveyors 42 of any suitable conventional design for gathering the straw collected by the pickup assembly and for depositing the collected straw at an inlet 44 at the front end of the chopping chamber 28.

The chopping chamber 38 extends in a longitudinal direction which is generally in the forward working direction 18, from the inlet 44 adjacent the pickup assembly at the front end of the chopper to an outlet 46 adjacent the rear end of the chopper. The inlet 44 is located below the discharge of the conveyors 42 so that straw is deposited in the inlet from above. The outlet 46 forms a discharge chute inclined upwardly and rearwardly from the chopping chamber which includes a series of baffles 48 which serve to evenly spread and distribute the chopped straw exiting the chopping chamber 38. A central baffle 49 spreads the chopped straw away from the path of the windrow being collected as some chaff will remain in this area. Accordingly it is desirable to spread the chopped straw away from the central path of the windrow.

The chopping chamber includes a first chopping element 50 and a second chopping element 52 supported therein. Each chopping element includes a shaft 54 which is rotatably supported within the chopping chamber about a respective longitudinal axis of the shaft which extends generally in the longitudinal direction at an upward and rearward incline from the inlet 44 of the chopping chamber to the outlet 46.

A plurality of first chopping blades 55 are fixedly mounted on the shaft 54 of the first chopping element 50 and a plurality of second chopping blades 56 fixedly mounted on the shaft 54 of the second chopping element 52. All of the blades extend radially outwardly from the respective shaft, spaced evenly about the circumference of the respective shaft in rows and also spaced axially from one another in the longitudinal direction.

The first blades 55 are all offset from the second blades 56 in the longitudinal direction of the axes of the shafts so that the sweep area of the first chopping blades 55 can overlap the sweep area of the second chopping blades 56 without concern for the blades contacting one another. The shafts 54 of the first and second chopping elements are positioned parallel to one another in alignment with the forward working direction at a lateral spacing from one another and generally at the same height as one another relative to the ground.

The shafts are positioned close enough to one another such that the respective sweep areas of the first and second chopping blades overlap at a central area overlap 58 between the shafts. The shafts 54 are rotated in the same direction of rotation. Both shafts are thus rotated clockwise, or both are rotated counter clockwise, so that at the area of overlap 58 the first chopping blades 55 and the second chopping blades 56 move in opposing directions.

Each of the chopping blades 55 and 56 increases in dimension in a circumferential direction as the blade increases in radial distance from the shaft to define a broad impeller surface 60. Each impeller surface 60 is generally flat and sloped in the longitudinal direction of the respective shaft at a forward incline into the direction of rotation towards a respective lead cutting edge 62. The cutting edge 62 serves to initially contact the straw and chop the straw while the broad impeller surface 60 at the rear side of each blade functions to generate a rearward thrust of air from the inlet to the outlet of the chopping chamber when the blades are rotated with the respective shafts 54 about the respective longitudinal axes of the shafts.

In use the straw chopper is connected to a towing vehicle which pulls the chopper for rolling movement on its wheels across the ground at a position which is laterally offset in relation to the towing vehicle when displaced in the forward working direction. The pickup assembly and the chopping elements are driven by connecting to the drive train 28 so that as the chopper is advanced across the field the pickup collects the straw for subsequent guidance by the conveyors 42 into the chopping chamber where the straw must pass through all of the blades between the inlet and the outlet of the chopping chamber before being discharged from the chopper. By rotating the shafts in the same direction and aligning the respective longitudinal axes thereof generally with the forward working direction at an upward and rearward incline, the straw must pass through many chopping blades while being moved along towards the outlet by action of the trust of air being generated by the rotating chopping blades. Providing the blades with respective impeller surfaces forces the chopped straw upwardly and rearwardly towards the outlet of the chopping chamber with sufficient force that the baffles can redirect the thrust of air to effectively spread the chopped straw laterally across a width which is much greater than the width of the straw chopper.

In other embodiments the chopper may be connected directly to the discharge of a combine instead of a towing vehicle while still realizing the benefits of: i) chopping blades from plural chopping elements being displaced in opposing directions at an area of overlap; and ii) the orientation of respective axis of the chopping elements extending at an upward inclination rearwardly in the longitudinal direction. In yet further embodiments, the chopper may be a self-propelled unit capable of advancing itself across the field to collect windrows of chopped or cut straw.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A straw chopper comprising:
a frame arranged to be supported for movement across the ground in a forward working direction;
a chopping chamber supported by the frame to extend generally in the forward working direction between an inlet arranged to receive straw and an outlet arranged to discharge the straw therefrom;
at least one shaft supported in the chopping chamber for rotation about a respective longitudinal axis extending generally in the forward working direction;
a plurality of chopping blades supported on said at least one shaft to extend radially outward from said at least one shaft;
each chopping blade including an impeller surface sloped forwardly into a direction of rotation of said at least one shaft so as to be arranged to generate a rearward thrust of air in the chopping chamber from the inlet to the outlet as the chopping blades are rotated about the about the respective longitudinal axis with said at least one shaft.

2. The chopper according to claim 1 wherein said at least one shaft comprises a pair of shafts, each supporting the chopping blades thereon for rotations about respective longitudinal axes.

3. The chopper according to claim 2 wherein the shafts are positioned relative to one another such that a sweep area of the blades of one of the shafts overlaps a sweep area of the blades of the other shaft.

4. The chopper according to claim 3 wherein the shafts are rotated in a common direction of rotation such that the blades of one of the shafts are displaced in an opposite direction to the blades of the other one of the shafts at the overlap of the sweep areas.

5. The chopper according to claim 1 wherein the frame is supported on respective wheels for rolling movement across the ground in the forward working direction.

6. The chopper according to claim 5 wherein the frame includes an offset hitch arm for connection to a towing vehicle in a laterally offset relationship.

7. The chopper according to claim 5 wherein the frame includes drive means such that the frame is self-propelled across the ground in the forward working direction.

8. The chopper according to claim 1 wherein there is provided a pickup assembly mounted on the frame forwardly of the chopping chamber comprising: a pickup shaft supported horizontally and transversely to the forward working direction for rotation about a respective longitudinal axis of the shaft and a plurality of tines extending radially outward from the shaft for collecting straw from the ground as the shaft is rotated, the shaft being rotated such that the tines at a front of the shaft are rotated upwardly.

9. The chopper according to claim 8 wherein the pickup assembly includes a conveyor which conveys straw from the pickup shaft to the inlet of the chopping chamber.

10. The chopper according to claim 1 wherein the longitudinal axis of said at least one shaft extends rearwardly at an upward incline from the inlet to the outlet of the chopping chamber.

11. The chopper according to claim 1 wherein there is provided a chute at the outlet of the chopping chamber which extends at an upward and rearward incline.

12. The chopper according to claim 1 wherein each chopping blade increases in dimension in a circumferential direction as the blade increases in radial distance from the shaft.

13. A straw chopper comprising:
a frame arranged to be supported for movement across the ground in a forward working direction;
a chopping chamber supported by the frame to extend generally in the forward working direction between an inlet arranged to receive straw and an outlet arranged to discharge the straw therefrom;
a pair of shafts supported in the chopping chamber for rotation about respective longitudinal axes extending generally in the forward working direction; and
a plurality of chopping blades supported on each shaft to extend radially outward from the respective longitudinal axis, the chopping blades of one shaft being offset in a direction of the longitudinal axes in relation to the chopping blades of the other shaft;
the shafts being positioned relative to one another such that a sweep area of the blades of one of the shafts overlaps a sweep area of the blades of the other shaft; and
the shafts being rotated in a common direction of rotation such that the blades of one of the shafts are displaced in an opposite direction to the blades of the other one of the shafts at the overlap of the sweep areas.

14. The chopper according to claim 13 wherein each chopping blade includes an impeller surface sloped forwardly into a direction of rotation of said at least one shaft so as to be arranged to generate a rearward thrust of air in the chopping chamber from the inlet to the outlet as the chopping blades are rotated about the about the respective longitudinal axis with said at least one shaft.

15. The chopper according to claim 13 wherein the frame is supported on respective wheels for rolling movement across the ground in the forward working direction.

16. The chopper according to claim 15 wherein the frame includes an offset hitch arm for connection to a towing vehicle in a laterally offset relationship.

17. The chopper according to claim 15 wherein the frame includes drive means such that the frame is self-propelled across the ground in the forward working direction.

18. The chopper according to claim 13 wherein there is provided a pickup assembly mounted on the frame forwardly of the chopping chamber comprising: a pickup shaft supported horizontally and transversely to the forward working direction for rotation about a respective longitudinal axis of the shaft and a plurality of tines extending radially outward from the shaft for collecting straw from the ground as the shaft is rotated, the shaft being rotated such that the tines at a front of the shaft are rotated upwardly.

19. The chopper according to claim 18 wherein the pickup assembly includes a conveyor which conveys straw from the pickup shaft to the inlet of the chopping chamber.

20. The chopper according to claim 13 wherein the longitudinal axis of said at least one shaft extends rearwardly at an upward incline from the inlet to the outlet of the chopping chamber.

\* \* \* \* \*